US011632007B2

(12) United States Patent
Groendahl et al.

(10) Patent No.: US 11,632,007 B2
(45) Date of Patent: Apr. 18, 2023

(54) STATOR ASSEMBLY COMPRISING ELECTRICAL INSULATION DEVICES HAVING AN OUTER SURFACE WITH ELEVATED SURFACE PORTIONS (71) Applicant: Siemens Gamesa Renewable Energy A/S, Brande (DK)

(72) Inventors: Erik Groendahl, Them (DK); Subhra Samanta, Ikast (DK); Arwyn Thomas, Cheshire (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 122 days.

(21) Appl. No.: 17/076,382

(22) Filed: Oct. 21, 2020

(65) Prior Publication Data

US 2021/0126503 A1 Apr. 29, 2021

(30) Foreign Application Priority Data

Oct. 28, 2019 (EP) .................................... 19205613

(51) Int. Cl.
*H02K 3/48* (2006.01)
*F03D 9/25* (2016.01)
*H02K 1/16* (2006.01)
*H02K 3/02* (2006.01)
(Continued)

(52) U.S. Cl.
CPC ................. *H02K 3/48* (2013.01); *F03D 9/25* (2016.05); *H02K 1/165* (2013.01); *H02K 3/02* (2013.01);
(Continued)

(58) Field of Classification Search
CPC . F03D 9/25; H02K 1/16; H02K 1/165; H02K 3/02; H02K 3/12; H02K 3/28;
(Continued)

(56) References Cited

U.S. PATENT DOCUMENTS 9,097,238 B2 * 8/2015 Lewke ..................... F03D 80/30
2019/0260254 A1 * 8/2019 Azar ......................... H02K 1/16
(Continued)

FOREIGN PATENT DOCUMENTS

DE 2625294 A1 12/1977
JP 2005110460 A 4/2005
JP 2016174441 A 9/2016

OTHER PUBLICATIONS

Tamai et al., English Machine Translation of 2016-174441 (Year: 2016).*
(Continued)

*Primary Examiner* — Rashad H Johnson
(74) *Attorney, Agent, or Firm* — Schmeiser, Olsen & Watts LLP (57) ABSTRACT A stator assembly including a frame structure having a stator teeth being circumferentially distributed around a longitudinal axis, wherein in between respective two neighboring stator teeth there is formed one stator slot; a winding system having a plurality of electric windings, wherein respectively one electric winding is wound around at least one stator tooth and is partially accommodated within two stator slots and each electric winding comprises an end winding portion which axially protrudes from the frame structure; and an insulation arrangement having a plurality of electric insulation devices, each insulation device surrounding a part of one electric winding is provided. Each insulation device includes an inner insulation portion being accommodated within the respective stator slot and an outer insulation portion protruding from the frame structure and surrounding a part of the respective end winding portion. The outer insulation portion includes an outer surface which includes elevated surface portions.

14 Claims, 5 Drawing Sheets (51) Int. Cl.
  *H02K 3/12* (2006.01)
  *H02K 3/28* (2006.01)
  *H02K 3/34* (2006.01)
  *H02K 7/18* (2006.01)

(52) U.S. Cl.
  CPC ............... *H02K 3/12* (2013.01); *H02K 3/28* (2013.01); *H02K 3/345* (2013.01); *H02K 7/1838* (2013.01)

(58) Field of Classification Search
  CPC ............ H02K 3/34; H02K 3/345; H02K 3/48; H02K 7/1838
  USPC ............................ 310/215, 216.105, 216.115
  See application file for complete search history.

(56) References Cited

U.S. PATENT DOCUMENTS

| | | | |
|---|---|---|---|
| 2019/0280546 A1* | 9/2019 | Soerensen | H02K 7/1838 |
| 2020/0136441 A1* | 4/2020 | Azar | H02K 1/265 |
| 2021/0359558 A1* | 11/2021 | Azar | H02K 1/265 |

OTHER PUBLICATIONS

Berr et al., English Machine Translation of DE 2625294 (Year: 1976).*

Extended European Search Report in corresponding European Patent Application No. 19205613.3 dated Apr. 14, 2020. 8 pages.

* cited by examiner

STATOR ASSEMBLY COMPRISING ELECTRICAL INSULATION DEVICES HAVING AN OUTER SURFACE WITH ELEVATED SURFACE PORTIONS

CROSS-REFERENCE TO RELATED APPLICATIONS

This application claims priority to European Patent Application No. 19205613.3, having a filing date of Oct. 28, 2019, the entire contents of which are hereby incorporated by reference.

FIELD OF TECHNOLOGY

The following relates to the technical field of electromechanical transducers such as electric motors or electric generators. Such electric generators can be employed e.g. in wind turbines for converting the mechanical power provided by wind into electric power to be fed e.g. into a utility grid. Specifically, the present invention relates to electric insulation measures within a stator assembly for an electromechanical transducer.

BACKGROUND

An electromechanical transducer, such as an electric generator installed in a wind turbine, comprises a rotor assembly which rotates relative to a stator assembly. The stator assembly includes a frame structure having a plurality of stator teeth being circumferentially distributed around a longitudinal axis. The stator slots extend along an axial direction being parallel to the longitudinal axis. This longitudinal axis is also the rotational axis of the rotor assembly.

A stator assembly further comprises an electric winding system having a plurality of electric windings which are typically made from copper and which are often also called simply coils. The electric windings are partially accommodated within respectively two stator slots. So called end winding portions axially protrude from the frame structure.

In order to prevent a short circuiting within the stator assembly the electric windings portions being accommodated within the stator slots are electrically insulated from the frame structure. The frame structure is typically a lamination of a plurality of metal plates, which are insulated from each other by means of an insulating varnish.

Depending on the voltage class of the electrical transducer different types and/or designs of insulation devices may be used. Insulation devices include e.g. an insulation tape and slot liners which are also called "slot insulation".

An end winding portion, also called "coil overhang", is defined as the part of the electric winding or coil which is located outside from the stator slots and which is needed to connect "two sides" of a coil. To avoid high electric field stress intensity at the exit of the stator slot, it is important to extent the insulation device out from the stator slots to a minimum distance which is known as creepage distance in a stator insulation arrangement.

The minimum creepage distance being necessary for a reliable operation of an electromechanical transducer is dependent on (a) the Root Mean Square (RMS) value of the voltage given between an electric phase conductor and the frame structure or between two phase conductors, (b) the type of insulation material, (c) the dimensions of the insulation device, and (d) the operating environment of the electromechanical transducer. Hence, with higher voltage class of the electromechanical transducer, it is necessary to increase creepage distance leading to an increase of the length of the end winding portion, which in turn will increase the resistive loss in the electromechanical transducer and reduce the performance of the electromechanical transducer.

Of course, the necessary creepage distance can be achieved by simply extending the slot insulation on the end winding portion with increased voltage class. However, also such an extension increases the length of the end winding portion because (i) the end winding portion is bended and (ii) the insulation device needs to end before the bending of the end winding starts. Hence, an elongation of insulation device goes along with an increased length of the end winding portion which, as described above, reduces the performance of the electromechanical transducer.

There may be a need for improving the performance of an electromechanical transducer.

SUMMARY

According to a first aspect of the present invention there is provided a stator assembly for an electromechanical transducer and in particular for an electric generator. The provided stator assembly comprises (a) a frame structure having a plurality of stator teeth being circumferentially distributed around a longitudinal axis, wherein in between respective two neighboring stator teeth there is formed one stator slot; (b) a winding system having a plurality of electric windings, wherein (b1) respectively one electric winding is wound around at least one stator tooth and is partially accommodated within two stator slots and (b2) each electric winding comprises an end winding portion which axially protrudes from the frame structure; and (c) an insulation arrangement having a plurality of electric insulation devices, each insulation device surrounding a part of one electric winding. Each insulation device comprises (i) an inner insulation portion being accommodated within the respective stator slot for preventing a direct electric contact between the respective electric winding and the frame structure and (ii) an outer insulation portion protruding from the frame structure and surrounding a part of the respective end winding portion. The outer insulation portion comprises an outer surface which comprises elevated surface portions (and of course also non-elevated surface portions).

The described stator assembly is based on the idea that by providing the outer surface of the outer insulation portion with elevated surface portions a creepage length between electrically non insolated parts of the end winding portion and the frame structure will be increased. This means that the electric resistance for unwanted creepage currents traveling between (i) the (metallic) conductor material of the end winding portion and (ii) the frame structure will be increased and, as a consequence, the amperage of such creepage currents will be reduced.

The described reduction of the amperage of creepage currents may provide the advantage that for a given voltage class of the electromechanical transducer the protrusion length of the outer insulation portion can be reduced. Hence, end winding length can be reduced. This in turn reduces the resistive loss in the complete winding. Hence, the performance of the electromechanical transducer will be increased. Further, a reduction of the protrusion length of the end winding portion allows the electromechanical transducer to be realized within a spatially compact design and/or with a reduced amount of (metallic) conductor material being necessary for realizing the end winding portions.

In this document the term "elevated surface portion" may particularly relate to a height level of a portion of the outer surface of the outer insulation portion which height level is different and in particular lower than the height level of another non elevated surface portion and/or another surface portion which is elevated to a smaller extend. Thereby, the "height" is not the height in the three-dimensional space, which is typically referred to as the z-coordinate. Instead, the term "height" refers to the distance between (i) the respective elevated surface portion and (ii) the conductor material of the respective end winding portion.

In case the outer insulation portion is made from a solid insulation material and comprises no cavities, the term "height" may also be seen as to describe the insulation material thickness of the outer insulation portion. In this case the presence of elevated (and of course also non elevated) surface portions may mean that there is a non-uniform thickness of the insulation material of the outer insulation portion surrounding the conductor material of the respective end winding.

In the described stator assembly, the axial protrusion of the end winding portion is given along a direction being parallel to the longitudinal axis of the frame structure. Just for the sake of clarity it is noted that this longitudinal axis may be collinear with a rotational axis of a rotor assembly of the electromechanical transducer.

With regard to the insulation portions the terms "outer" and "inner" refer to a direction being parallel to the longitudinal axis. By contrast thereto, the outer surface of the outer insulation portion is the surface which faces away from the conductor material of the respective end winding portion.

It is mentioned that typically an electric winding comprises two end winding portions protruding from the frame structure in opposing directions both being parallel to the longitudinal axis. This means that also an (electric) insulation device typically comprises, apart from the inner insulation portion and the mentioned outer insulation portion a further outer insulation portion. Thereby, one outer insulation portion out of these two outer insulation portions is assigned to one end winding portion.

Further, it is mentioned that for electrically insulating one electric winding, which is accommodated within two stator slots, from the frame structure, two insulations devices may be used. Thereby, one insulation device is assigned to one of the two stator slots.

According to an embodiment of the present invention the elevated surface portions of the outer insulation portion are spatially distributed and formed in such a manner that along a direction of protrusion there is given a thickness variation of insulating material of the outer insulation portion, which insulating material surrounds the respective part of the respective end winding portion. Thereby, the direction of protrusion is parallel to the longitudinal axis of the entire stator assembly.

According to a further embodiment of the present invention the elevated surface portions form rings, each ring surrounding the respective part of the respective end winding portion in an annular manner. This may provide that the outer insulation portion and in particular the three dimensionally shaped or curved outer surface of the outer insulation portion comprises a comparatively simple spatial design, which can be formed in a simple and easy manner.

According to a further embodiment of the present invention the elevated surface portions form at least one elongate raised structure which surrounds the respective part of the respective end winding portion in a spiral manner. Also this embodiment may provide the advantage that it can be realized in a simple and easy manner e.g. by twisting an originally tubular or sleeve like member made from insulating material.

According to a further embodiment of the present invention the outer insulation portion is made from two parts, an inner part having a tubular shape with a uniform wall thickness and an outer part having a non-uniform wall thickness or having a corrugated shape. Also this embodiment may provide the advantage that the outer insulation portion can be manufactured in a simple and easy manner.

According to a further embodiment of the present invention the outer part is a corrugated member.

The corrugation may be pregiven or may be generated during a processing, wherein the outer part is imposed over the inner part. A formation of the corrugation during imposing may be given due to a mechanical friction between the outer surface of the inner part and the inner surface of the outer part.

According to a further embodiment of the present invention the inner part is integrally formed with the inner insulation portion. Also this constructive structural design feature may allow to further simplify the formation respectively the fabrication of the entire insulation device.

According to a further embodiment of the present invention the stator assembly comprises the following feature: With respect to an outer insulation portion with an even outer surface being free of elevated surface portions the elevated surface portions cause an increase of a creepage length of a creepage current travelling from uninsulated conductor material of the respective end winding portion to the frame structure.

As has already been mentioned above, an increase of the creepage length may allow to realize the stator assembly (of a certain voltage class) with shorter end windings.

According to a further embodiment of the present invention the creepage length is increased at least by a factor of 1.2, by a factor of 1.4, and by a factor of 1.5.

According to a further embodiment of the present invention one electric winding is accommodated within two neighboring stator slots. This means that the electric winding is wound around one stator tooth only and the winding system is realized in a so-called concentrated winding design. Hence, the above described creepage length increase can (also) be used for concentrated winding stator assemblies.

According to a further embodiment of the present invention one electric winding is accommodated within two stator slots which are circumferentially spaced apart in such a manner that at least one other stator slot in arranged between the two stator slots. This means that the respective electric winding is wound around at least two stator teeth. Such a winding system architecture is often called a distributed winding design. Hence, the above described creepage length increase can (also) be used for distributed winding stator assemblies.

According to a further aspect of the present invention there is provided an electromechanical transducer for converting mechanic energy into electric energy or vice versa for converting electric energy into mechanic energy. The provided electromechanical transducer comprises (a) a stator assembly as described above and (b) a rotor assembly being rotatable around the longitudinal axis.

The provided electromechanical transducer is based on the idea that with the above described improved creepage current behavior of the stator assembly the performance of the electromechanical transducer can be increased in a comparatively simple and easy manner. Further, as has been already mentioned above, the entire electromechanical transducer can be realized in a compact manner and/or, in particular with regard to the amount of conductor material being necessary for forming the end windings, in an effective and economic manner.

The rotor assembly may comprise permanent magnets which in operation interact electromagnetically with the electric windings of the winding system. The rotor assembly and the stator assembly may be spatially designed in such a manner that between the permanent magnets and the electric windings there is formed an air gap.

The described electromechanical transducer may be a synchronous machine and in particular a synchronous electric generator.

According to a further aspect of the present invention there is provided a wind turbine for generating electrical power. The provided wind turbine comprises (a) a tower; (b) a nacelle which is arranged at a top end of the tower; (c) a wind rotor which is arranged at a front end of the nacelle and which comprises at least one blade; and (d) an electromechanical transducer as described above.

According to a further aspect of the present invention there is provided a method for manufacturing a stator assembly. The stator assembly may be a stator assembly as described above. The provided the method comprises (a) forming a frame structure having a plurality of stator teeth being circumferentially distributed around a longitudinal axis, wherein in between respective two neighboring stator teeth there is formed one stator slot; (b) forming a winding system having a plurality of electric windings, wherein (b1) respectively one electric winding is wound around at least one stator tooth and is partially accommodated within two stator slots and (b2) each electric winding comprises an end winding portion which axially protrudes from the frame structure; and (c) forming an insulation arrangement having a plurality of electric insulation devices, each insulation device surrounding a part of one electric winding. Each insulation device comprises (i) an inner insulation portion being accommodated within the respective stator slot for preventing a direct electric contact between the respective electric winding and the frame structure and (ii) an outer insulation portion protruding from the frame structure and surrounding a part of the respective end winding portion. The outer insulation portion comprises an outer surface which comprises elevated surface portions (and non-elevated surface portions).

It has to be noted that embodiments of the invention have been described with reference to different subject matters. In particular, some embodiments have been described with reference to a method type claim whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claim and features of the apparatus type claims is considered as to be disclosed with this document.

The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Some of the embodiments will be described in detail, with reference to the following figures, wherein like designations denote like members, wherein.

DETAILED DESCRIPTION

The illustration in the drawing is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 1:
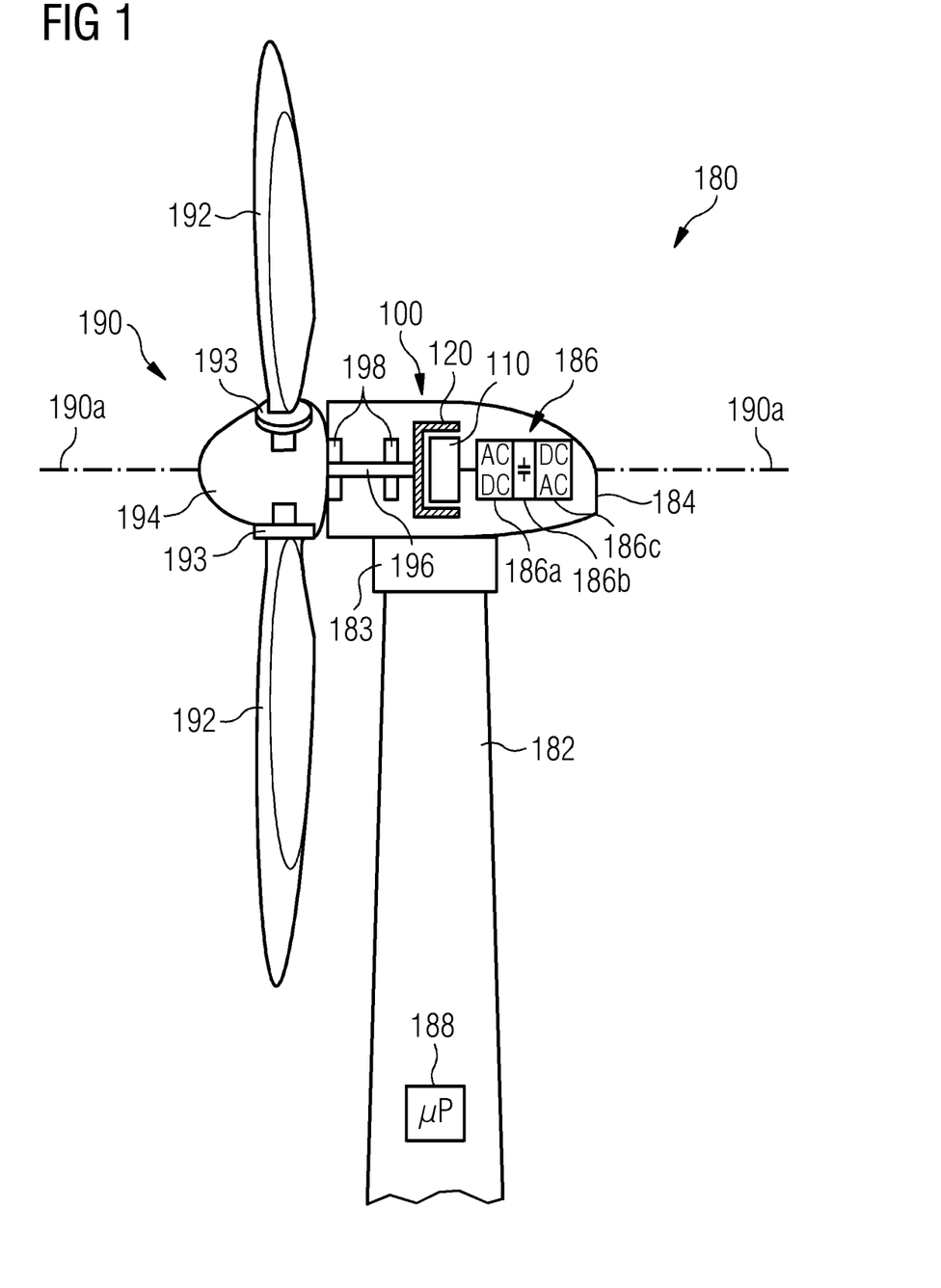
FIG. 1 depicts a wind turbine comprising an electrical generator in accordance with an embodiment of the invention.

FIG. 1 shows a wind turbine 180 according to an embodiment of the present invention. The wind turbine 180 comprises a tower 182, which is mounted on a non-depicted fundament. On top of the tower 182 there is arranged a nacelle 184. In between the tower 182 and the nacelle 184 there is provided a yaw angle adjustment device 183, which is capable of rotating the nacelle 184 around a not depicted vertical axis, which is aligned with the longitudinal extension of the tower 182.

The wind turbine 180 further comprises a wind rotor 190 having three blades 192. In the perspective of FIG. 1 only two blades 192 are visible. The wind rotor 190 is rotatable around a rotational axis 190a. This allows aligning the nacelle with the direction of the wind driving the wind rotor. The blades 192, which are mounted at a hub 194, extend radially with respect to the rotational axis 190a.

In between the hub 194 and a blade 192 there is respectively provided a blade adjustment device 193 in order to adjust the blade pitch angle of each blade 192 by rotating the respective blade 192 around a not depicted axis being aligned substantially parallel with the longitudinal extension of the blade 192. By controlling the blade adjustment device 193 the blade pitch angle of the respective blade 192 can be adjusted in order to control the energy capture from the wind driving the wind rotor 190.

Within the nacelle 184 there is provided an electric generator 100. In accordance with basic principles of electrical engineering the electric generator 100 comprises a stator assembly 110 and a rotor assembly 120. According to the embodiment described here the electric generator 100 is realized with a so-called inner stator-outer rotor configuration. Permanent magnets being attached to the rotor assembly 120 travel around stator segments being attached at the stator assembly 110. In between the stator segments, which comprise stator windings or coils for picking up a time alternating magnetic induction, and the permanent magnets, there is formed an air gap. According to the embodiment described here the stator assembly 110 is realized in the concentrated winding design. Further details are given below.

The wind rotor 190 is rotationally coupled with the rotor assembly 110 by means of a rotatable shaft 196. A schematically depicted bearing assembly 198 is provided in order to hold in place both the wind rotor 190 and the rotor assembly 120. As can be seen from FIG. 1, the shaft 196 extends along the rotational axis 190a. The rotational axis 190a is identic with a center axis of the stator assembly 110.

It is mentioned that the wind turbine 180 is a so-called direct drive wind turbine wherein between wind rotor 190 and rotor assembly 120 there is not provided a gear box. However, it is mentioned that the electric generator 100 could also be driven by the wind rotor 190 indirectly via a gear box, which may be used to convert the number of revolutions of the wind rotor 190 typically into a higher number of revolutions of the rotor assembly 120.

In order to provide an AC power signal being electrically matched with a power signal of a utility grid receiving electric power from the wind turbine 180, the electric output of the stator assembly 110 is electrically connected to a power converter 186. The power converter 186 comprises a generator side AC-DC converter 186a, an intermediate DC bridge 186b, and a grid side DC-AC converter 186c. The AC-DC converter 186a and the DC-AC converter 186c comprise several not depicted high power semiconductor switches, which in a known manner are arranged in a bridge configuration for each phase of an AC current provided by the electric generator 100. Although not indicated in the drawing it is pointed out that the power converter 186 is connected typically via a usual transformer to the utility grid. The wind turbine 180 is not a so-called stand alone wind turbine.

The wind turbine 180 further comprises a control system 188 for operating the wind turbine 100 in a highly efficient manner. Apart from controlling for instance the yaw angle adjustment device 183 the depicted control system 188 is also used for adjusting the blade pitch angle of the blades 192 of the wind rotor 190 in an optimized manner.

Figure 2:
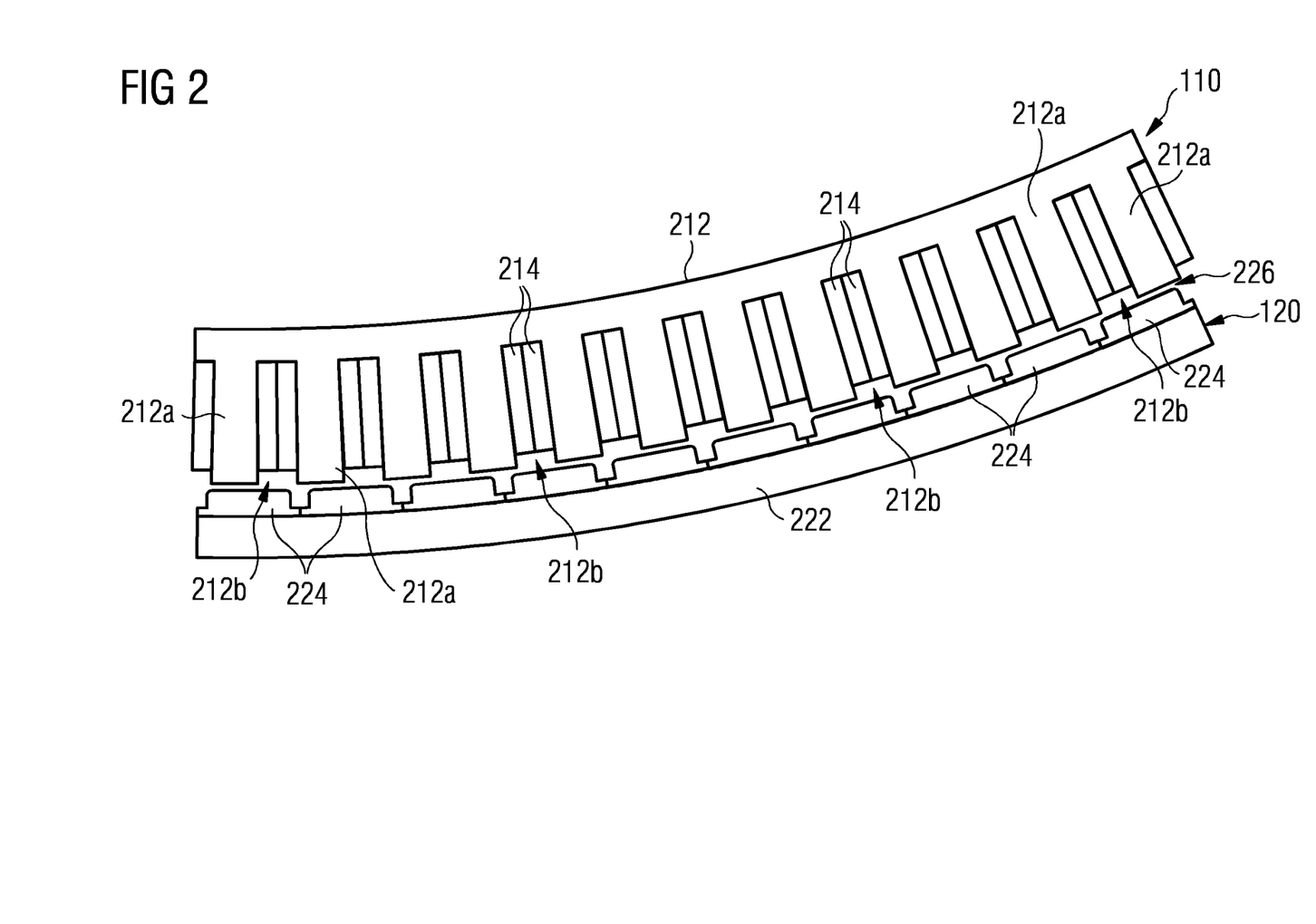
FIG. 2 depicts an enlarged cross-sectional view of the stator assembly and the rotor assembly of the generator of the wind turbine of FIG. 1.

FIG. 2 shows an enlarged cross-sectional view of the stator assembly 110 and the rotor assembly 120 of the generator 100, which is depicted schematically in FIG. 1. The stator assembly 110 comprises a stator frame structure 212 and a plurality of stator teeth 212a. The frame structure 212 and the stator teeth 212a represent a stator yoke. Due to the inner stator-outer rotor configuration the stator teeth 212a are directed radially outward from a center axis, which in FIG. 1 is denominated with reference numeral 190a.

In between two neighboring teeth 212a there is formed a recess which in this document is defined as one slot 212b. In accordance with the concept of concentrated winding one slot 212b is occupied by two stator windings 214. One of the two stator windings 214 is around one tooth 212a and the other one is wound around the neighboring tooth 212a. In accordance with basic electric principles of an electrical generator the stator windings 214 are subdivided into different groups of stator windings 214, wherein each group is assigned to one electric phase. The corresponding electric circuitry for such a "grouping" is not depicted in FIG. 2 in order to not to obscure an understanding of this description.

The rotor assembly 120, which is radially external with respect the stator assembly 110 and which is rotatable about the center axis 190a (see FIG. 1), comprises a rotor frame structure 222 and a plurality of permanent magnets 224. These permanent magnets 224 are attached to an inner side of the rotor frame structure 222, which inner side faces the stator assembly 110. A circumferential air gap 226 is provided between the stator assembly 110 and the rotor assembly 120.

Each of the stator teeth 212a has a length, which is measured along a direction being perpendicular to the plane of drawing of FIG. 2. The width of each stator tooth 212a is measured along the circumferential direction (around the center axis), which circumferential direction is within the plane of drawing of FIG. 2. It is obvious that in order to complete a stator windings 214 around a stator tooth 212a it is necessary to provide so called end winding portions or coil heads which are not located within the respective slot. A end winding portion or coil head (not depicted in FIG. 2) of the stator windings 214 protrudes out from the plane of drawing of FIG. 2.

Figure 3:
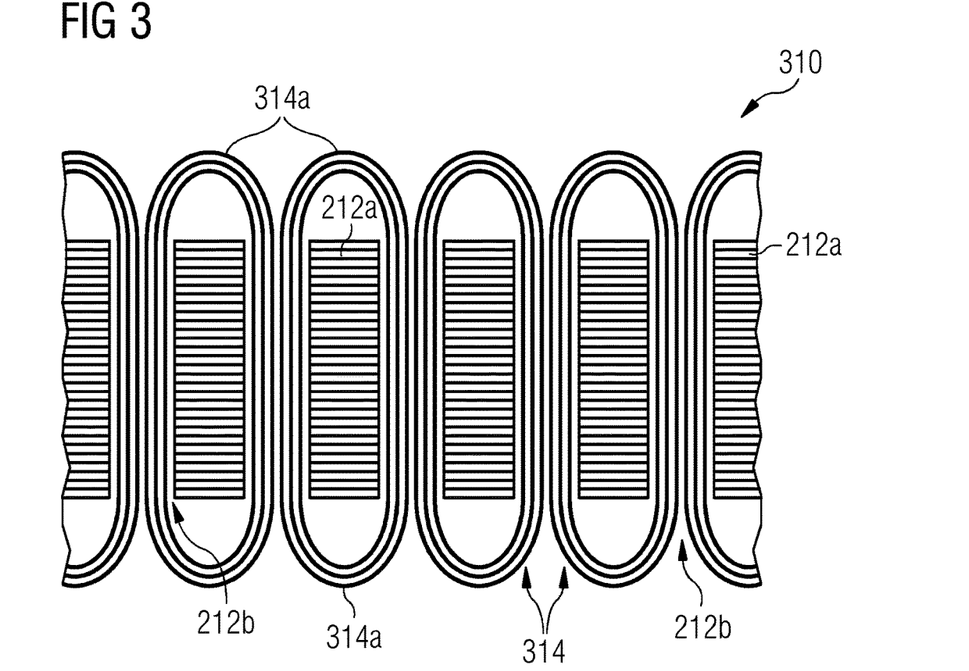
FIG. 3 depicts a stator assembly being realized in the concentrated winding design in a circumferential view.

FIG. 3 shows in a circumferential view a stator assembly 310 being realized in the so-called concentrated winding design. Each slot 212b accommodates sections of two windings 314. With respect to the respective slot 212b one of the two windings 314 is wound solely around the "left" tooth 212a and the other one of the two windings 314 is solely wound around the right tooth 212a. Apart from the portions being directly accommodated within the slots 212b, each winding 314 comprises so called end winding portions 314a which axially protrude from the frame structure respectively from the stator teeth 212a.

The stator end windings 314a, which are made from a solid and mechanically stiff material, are completely located in air. Hence, it is not necessary to provide an electric insulation for the end windings. This is of course not the case for the sections of the windings 314 which are accommodated within the slots 212b. In the region of the slots 212b an electric insulation (not depicted in FIG. 3) is essential. As has already been mentioned in the introductory portion of this document this electric insulation protrudes out of the stator slots 212b to a certain extend.

Figure 4:
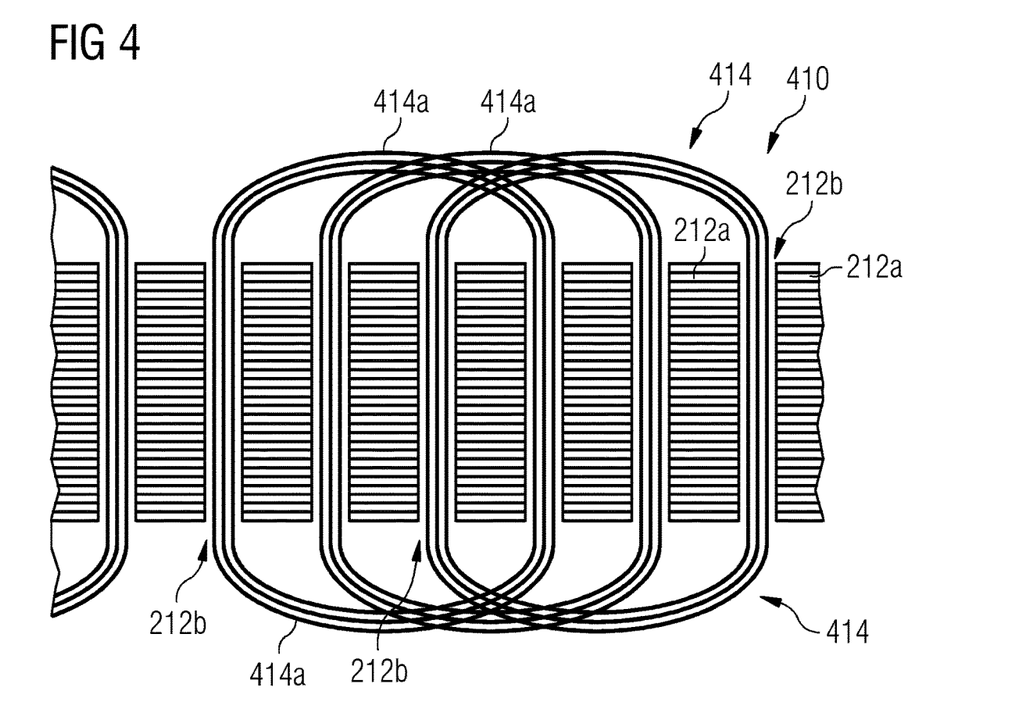
FIG. 4 depicts a stator assembly being realized in the distributed winding design in a circumferential view.

FIG. 4 shows in a circumferential view a stator assembly 410 being realized in the so-called distributed winding design. In this design one stator winding is wound around several stator teeth 212a. Further, one slot 212b accommodates only a portion of one winding 414. According to the exemplary embodiment described here three windings 414, which respectively are assigned to one electric phase, are spatially arranged with respect to each other in an interleaving manner.

Figures 5, 6:
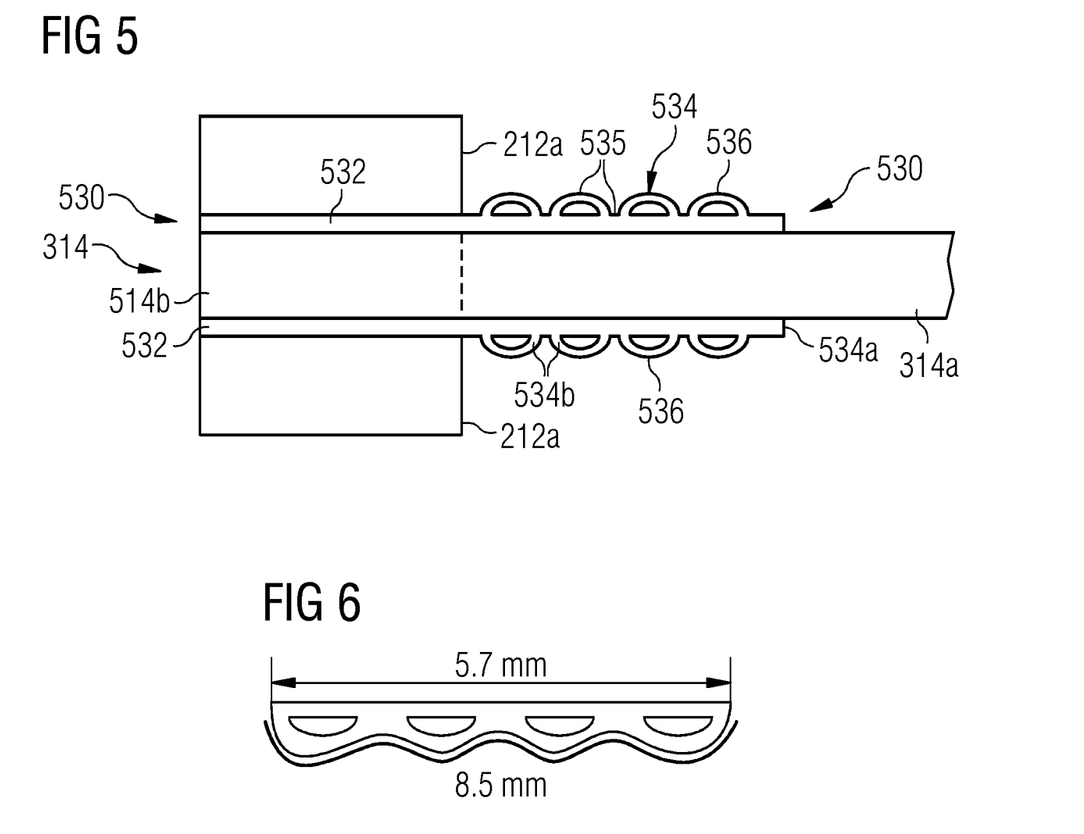
FIG. 5 depicts a stator winding insulation design according to a first embodiment of the invention.
FIG. 6 depicts an exemplary creepage length increase for an outer insulation portions having curved elevated surface portions.

FIG. 5 shows in a cross sectional view a stator winding insulation design according to a first embodiment of the present invention. For the sake of clarity of illustration, only a section of a stator winding 314 (and a section of a stator end winding 314a) is shown. The section of the stator winding 314, which is directly accommodated between two stator teeth 212a, is denominated with reference numeral 514b.

The stator winding 314 is surrounded with an insulation device 530. The insulation device 530 comprises an inner insulation portion 532. This inner insulation portion 532 is directly located within the stator slot formed between the two stator teeth 212a.

The insulation device 530 further comprises an outer insulation portion 534, which (a) axially protrudes from the stator yoke comprising the two shown stator teeth 212a and which (b) covers the outer surface of the section of the (metallic) stator end winding 314a. An outer surface 535 of the outer insulation portion 534 has a corrugated shape with elevated surface portions 536. This corrugated shape leads to an increase of the length which has to be "travelled" by an unwanted creepage current when "travelling" along the surface of the outer insulation portion 534 between the "uncovered part" of the end winding 314a end winding 314a and the stator yoke. With such an increase of the creepage length the electric resistance for the creepage current will be increased. This leads to a reduction of the amperage of such an unwanted creepage current.

As can be generally taken from FIG. 5, a basic aspect of the present invention described in this document is that with the elevated surface portions the creepage length at a stator slot exit will be increased without increasing the (axial) length of the outer insulation portion. Hence, the voltage class of the respective stator assembly will be increased.

According to the embodiment described in FIG. 5, the outer insulation portion 534 is made from two parts. An inner part 534a having a substantially tubular shape with a uniform wall thickness and an outer part 534b having a corrugated shape. This allows the inner part 534a of the insulation device 530 to be pre-formed in shape as the inside dimensions of the slot formed between the two neighboring stator teeth 212a. The outer corrugated part 534b may be made from the same material as the inner cylindrical part 534a. The material may be paper. The outer part 534b may be attached to the inner part 534b e.g. by means of a two-component glue.

Figure 7:
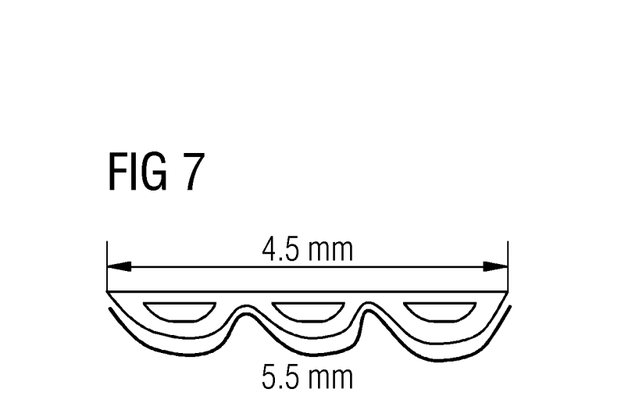
FIG. 7 depicts an exemplary creepage length increase for an outer insulation portions having trapezoidal elevated surface portions.

FIGS. 6 and 7 illustrate examples for possible corrugated shapes with an estimated increase in creepage lengths. As can be calculated easily from the dimensions given in these Figures, the design shown in FIG. 6, wherein the raised surface portions are curved surface portion, increase the creepage length by 49%. The design shown in FIG. 7, wherein the raised surface portions are part of a trapezoidal shape, increase the creepage length by 22%.

Figure 8:
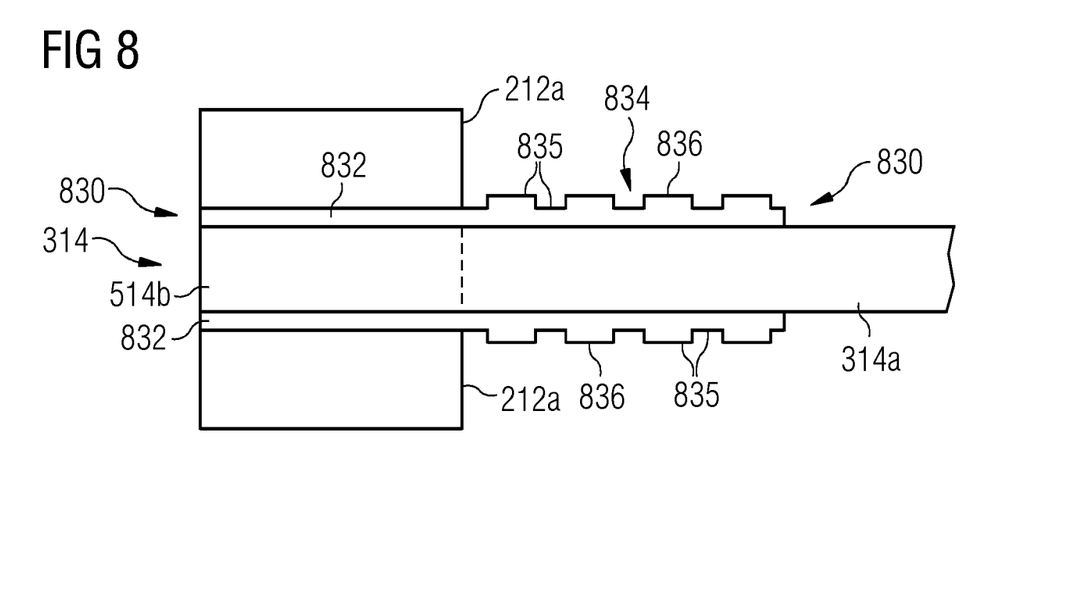
FIG. 8 depicts a stator winding insulation design according to a second embodiment of the invention.

FIG. 8 shows another stator winding insulation design with an insulation device 830. Again, an inner insulation portion 832 of the insulation device 830 is located directly within the stator slot formed between the two neighboring stator teeth 212a. An outer insulation portion 834 of the insulation device 830 (axially) protrudes from the stator yoke.

In the cross sectional view of FIG. 8 an outer surface 835 of the outer insulation portion 834 comprises a stepped shape. The upper or more precisely the radially outer flat portions represent elevated surface portions 836. It can be easily understood that also this type of outer surface 835 yields an increase of the creepage length.

The stepped shape of the outer surface 835 can be realized by annular rings which extend around an inner cylindrical part of the outer insulation portion 834. This results in a design as illustrated in FIG. 8. However, in other not depicted embodiments the elevated surface portions can be realized with an elongated raised structure which surrounds the inner cylindrical part of the outer insulation portion 834 in a spiral manner.

According to a very specific exemplary embodiment the elevated surface portions 836 can be realized with roving rope knots formed on the cylindrical inner part of the outer insulation portion 834.

Figure 9:
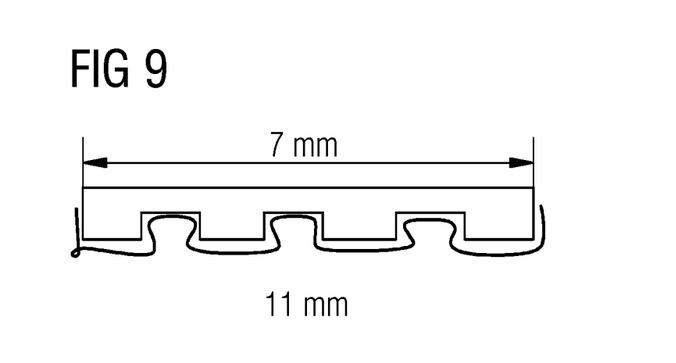
FIG. 9 depicts an exemplary creepage length increase for an outer insulation portions having elevated surface portion which are realized with annular rings.

FIG. 9 illustrates an exemplary creepage length increase for the design shown in FIG. 8. As can be calculated easily from the dimensions given in this Figure, this design with a stepped outer surface increases the creepage length by 57%.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A stator assembly for an electromechanical transducer, the stator assembly comprising;
    a frame structure having a plurality of stator teeth being circumferentially distributed around a longitudinal axis, wherein in between respective two neighboring stator teeth there is formed one stator slot;
    a winding system having a plurality of electric windings, wherein respectively one electric winding is wound around at least one stator tooth and is partially accommodated within two stator slots; and
    each electric winding comprises an end winding portion which axially protrudes from the frame structure; and
    an insulation arrangement having a plurality of electric insulation devices, each insulation device surrounding a part of one electric winding;
    wherein each insulation device comprises:
    an inner insulation portion being accommodated within the respective stator slot for preventing a direct electric contact between the respective electric winding and the frame structure; and
    an outer insulation portion protruding from the frame structure and surrounding a part of the respective end winding portion; and
    wherein the outer insulation portion comprises an outer surface which comprises elevated surface portions;
    wherein the elevated surface portions form at least one elongate raised structure which surrounds the respective part of the respective end winding portion in a spiral manner.

2. The stator assembly as set forth in claim 1, wherein the elevated surface portions of the outer insulation portion are spatially distributed and formed in such a manner that along a direction of protrusion there is given a thickness variation of insulating material of the outer insulation portion, which insulating material surrounds the respective part of the respective end winding portion.

3. The stator assembly as set forth in claim 1, wherein the elevated surface portions form rings, each ring surrounding the respective part of the respective end winding portion in an annular manner.

4. The stator assembly as set forth in claim 1, wherein the outer insulation portion is made from two parts, an inner part having a tubular shape with a uniform wall thickness and an outer part having a non-uniform wall thickness or having a corrugated shape.

5. The stator assembly as set forth in claim 1, wherein the outer part is a corrugated member.

6. The stator assembly as set forth in claim 1, wherein an inner part is integrally formed with the inner insulation portion.

7. The stator assembly as set forth in claim 1, wherein the elevated surface portions cause an increase of a creepage length of a creepage current travelling from uninsulated conductor material of the respective end winding portion to the frame structure.

8. The stator assembly as set forth in claim 7, wherein the creepage length is increased at least by a factor of 1.2.

9. The stator assembly as set forth in claim 1, wherein one electric winding is accommodated within two neighboring stator slots.

10. The stator assembly as set forth in claim 1, wherein one electric winding is accommodated within two stator slots which are circumferentially spaced apart in such a manner that at least one other stator slot in arranged between the two stator slots.

11. An electromechanical transducer for converting mechanic energy into electric energy or vice versa for converting electric energy into mechanic energy, the electromechanical transducer comprising:
the stator assembly as set forth in claim 1; and
a rotor assembly being rotatable around the longitudinal axis.

12. A wind turbine for generating electrical power, the wind turbine comprising:
a tower;
a nacelle which is arranged at a top end of the tower;
a wind rotor which is arranged at a front end of the nacelle and which comprises at least one blade; and
the electromechanical transducer as set forth in claim 11, wherein the rotor assembly of the electromechanical transducer is mechanically coupled with the wind rotor.

13. A method for manufacturing a stator assembly, the method comprising:
forming a frame structure having a plurality of stator teeth being circumferentially distributed around a longitudinal axis, wherein in between respective two neighboring stator teeth there is formed one stator slot;
forming a winding system having a plurality of electric windings, wherein respectively one electric winding is wound around at least one stator tooth and is partially accommodated within two stator slots; and
each electric winding comprises an end winding portion which axially protrudes from the frame structure; and
forming an insulation arrangement having a plurality of electric insulation devices, each insulation device surrounding a part of one electric winding;
wherein each insulation device comprises
an inner insulation portion being accommodated within the respective stator slot for preventing a direct electric contact between the respective electric winding and the frame structure; and
an outer insulation portion protruding from the frame structure and surrounding a part of the respective end winding portion; and
wherein the outer insulation portion comprises an outer surface which comprises elevated surface portions;
wherein the elevated surface portions form at least one elongate raised structure which surrounds the respective part of the respective end winding portion in a spiral manner.

14. A stator assembly for an electromechanical transducer, the stator assembly comprising;
a frame structure having a plurality of stator teeth being circumferentially distributed around a longitudinal axis, wherein in between respective two neighboring stator teeth there is formed one stator slot;
a winding system having a plurality of electric windings, wherein respectively one electric winding is wound around at least one stator tooth and is partially accommodated within two stator slots; and
each electric winding comprises an end winding portion which axially protrudes from the frame structure; and
an insulation arrangement having a plurality of electric insulation devices, each insulation device surrounding a part of one electric winding;
wherein each insulation device comprises:
an inner insulation portion being accommodated within the respective stator slot for preventing a direct electric contact between the respective electric winding and the frame structure; and
an outer insulation portion protruding from the frame structure and surrounding a part of the respective end winding portion; and
wherein the outer insulation portion comprises an outer surface which comprises elevated surface portions;
wherein the outer insulation portion is made from two parts, an inner part having a tubular shape with a uniform wall thickness and an outer part having a non-uniform wall thickness or having a corrugated shape.

* * * * *